(12) United States Patent
Klinkhammer et al.

(10) Patent No.: US 9,541,110 B2
(45) Date of Patent: Jan. 10, 2017

(54) DETACHABLE HOLDER

(71) Applicants: DENSO International America, Inc., Southfield, MI (US); DENSO CORPORATION, Kariya, Aichi-pref. (JP)

(72) Inventors: John Klinkhammer, Livonia, MI (US); John Uhrick, Royal Oak, MI (US)

(73) Assignees: DENSO International America, Inc., Southfield; DENSO CORPORATION, Kariya (JP)

( * ) Notice: Subject to any disclaimer, the term of this patent is extended or adjusted under 35 U.S.C. 154(b) by 293 days.

(21) Appl. No.: 14/277,451

(22) Filed: May 14, 2014

(65) Prior Publication Data

US 2015/0328951 A1 Nov. 19, 2015

(51) Int. Cl.
*F16B 19/00* (2006.01)
*F16B 5/06* (2006.01)
*B60H 1/00* (2006.01)
*F16B 5/02* (2006.01)

(52) U.S. Cl.
CPC ......... *F16B 5/0642* (2013.01); *B60H 1/00207* (2013.01); *F16B 5/0664* (2013.01); *F16B 5/02* (2013.01)

(58) Field of Classification Search
CPC ... F16B 5/0641; F16B 5/0664; B50H 1/00207
USPC ....................................................... 411/508
See application file for complete search history.

(56) References Cited

U.S. PATENT DOCUMENTS

| | | | |
|---|---|---|---|
| 3,722,037 A | 3/1973 | Jaeger | |
| 3,727,271 A | 4/1973 | Znamirowski | |
| 4,431,355 A | 2/1984 | Jünemann | |
| 4,627,760 A | 12/1986 | Yagi et al. | |
| 4,728,068 A | 3/1988 | Rivkin | |
| 4,739,543 A | 4/1988 | Harris, Jr. | |
| 5,326,082 A | 7/1994 | Ecktman et al. | |
| 5,342,139 A | 8/1994 | Hoffman | |
| 5,448,804 A | 9/1995 | Warren | |
| 5,658,110 A | 8/1997 | Kraus | |
| 6,481,682 B2 * | 11/2002 | Miura | F16B 5/0635 24/297 |
| 7,374,200 B2 * | 5/2008 | Ikeda | B60R 21/213 280/728.2 |
| 7,562,857 B2 * | 7/2009 | Nagai | B60Q 3/0203 248/222.12 |
| 7,637,527 B2 * | 12/2009 | Mazanek | B60R 21/04 280/728.2 |
| 7,669,807 B2 | 3/2010 | Stigler et al. | |
| 7,757,997 B2 * | 7/2010 | Smutny | B60R 16/0215 24/16 R |
| 2008/0066266 A1 | 3/2008 | Scroggie et al. | |
| 2012/0240362 A1 | 9/2012 | Lee | |

* cited by examiner

*Primary Examiner* — Gary Estremsky

(57) ABSTRACT

A detachable holder includes a base and a body. The body is integrally molded with the base and projected from the base. The body is configured to be inserted in a hole formed in a plate member. When the body is inserted in the hole, the body holds the base on the plate member. In addition, the body locates the base relative to the plate member. In addition, the base is detachable from the plate member from one side of the plate member. In addition, the base is detachable from the plate member from an other side of the plate member opposite of the one side.

15 Claims, 8 Drawing Sheets

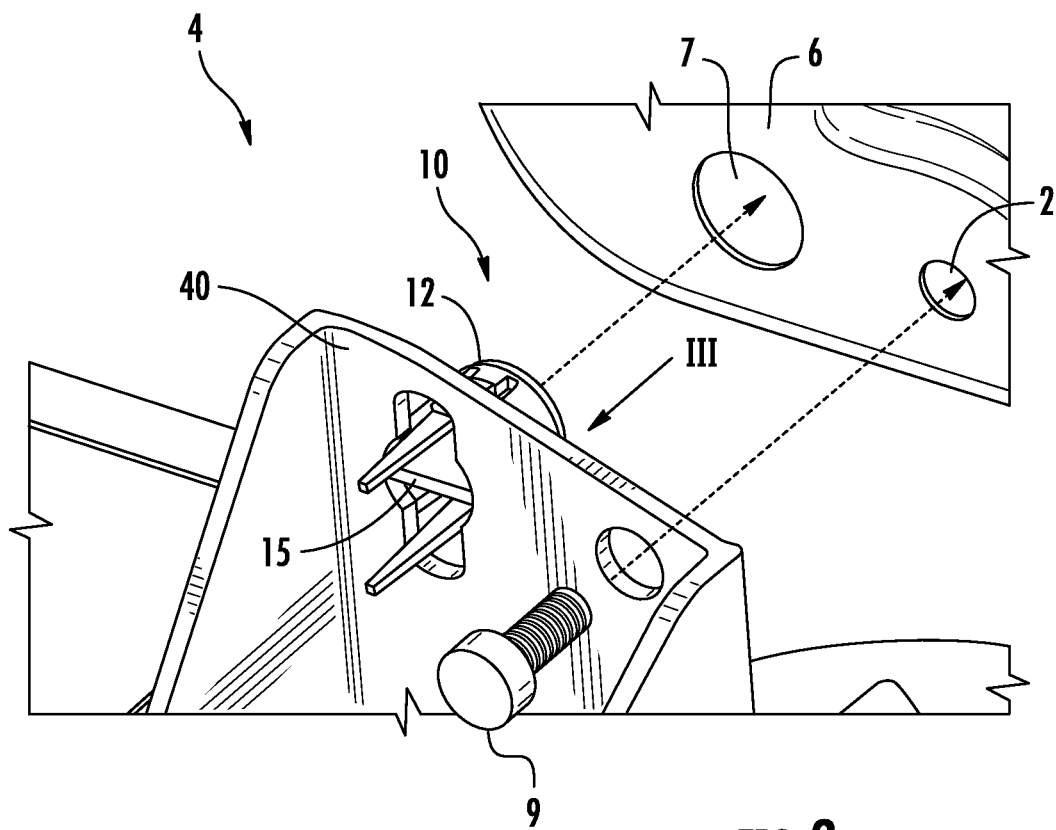
FIG. 2
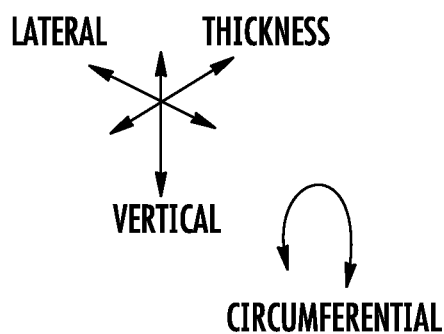

DETACHABLE HOLDER

TECHNICAL FIELD

The present disclosure relates to a detachable holder. The detachable holder is employed in, for example, a case for a vehicular heating, ventilation, and air conditioning system.

BACKGROUND

A vehicle may generally include a heating, ventilation, and air conditioning (HVAC) system. The HVAC system is installed in, for example, a space in front of a passenger cabin. The HVAC system includes an HVAC case accommodating a blower fan, an evaporator, and the like. The HVAC system is generally fixed to a vehicle body by, for example, screwing to the vehicle body.

The fixation of the HVAC system may include a two-part process. Specifically, the HVAC system is primarily lifted by an operator and held by the operator at a predetermined position. The HVAC system is secondarily mounted to a vehicle body, such as a sheetmetal of the vehicle, by screwing a fastener. In the two-part process, an operator is required to hold the HVAC system securely at the predetermined position, while the HVAC is screwed by the fastener. The conventional process may exert a burden on the operator.

For example, it is conceivable that the HVAC is once temporarily installed to a vehicle and subsequently fastened to the vehicle in a sequential manufacturing line. Specifically, one operator installs the HVAC temporarily, without fastening the HVAC to the vehicle, at a first station in the manufacturing line. Subsequently, the vehicle and the temporarily installed HVAC move down to a subsequent second station in the manufacturing line, and another operator fastens the temporarily installed HVAC. It is desirable, without an operator close to the HVAC and the vehicle, to hold the temporarily installed HVAC while the HVAC and the vehicle move to the second station.

SUMMARY

The present disclosure addresses the above-described concerns.

According to an aspect of the present disclosure, a detachable holder comprises a base. The detachable holder further comprises a body integrally molded with the base and projected from the base. When the body is inserted in a hole formed in a plate member: the body holds the base on the plate member; the body locates the base relative to the plate member; the base is detachable from the plate member from one side of the plate member; and the base is detachable from the plate member from an other side of the plate member opposite of the one side.

According to another aspect of the present disclosure, a detachable holder comprises a base. The detachable holder further comprises a tubular body integrally molded with the base and projected from the base. The tubular body includes a tip portion and a wing. The wing includes a first angular wall and a second angular wall. The first angular wall extends from the tip portion toward the second angular wall. The first angular wall gradually increases in height thereby to form a first slant surface, which is inclined relative to the tubular body, the first slant surface extending toward the base to be distant from the tubular body. The second angular wall extends from the first angular wall toward the base. The second angular wall gradually decreases in height thereby to form a second slant surface, which is inclined relative to the tubular body, the second slant surface extending toward the base to be close to the tubular body.

According to another aspect of the present disclosure, a detachable holder comprises a base having a slot, which is a hollow space. The detachable holder further comprises a tubular body integrally molded with the base and projected from the base. The tubular body includes a tip portion and a wing. The wing extends from the tip portion toward the base. The wing includes a first angular wall and a right-angled wall. The first angular wall extends from the tip portion toward the right-angled wall. The first angular wall gradually increases in height thereby to form a first slant surface, which is inclined relative to the tubular body, the first slant surface extending toward the slot to be distant from the tubular body. The right-angled wall is faced to the slot. The right-angled wall has a substantially flat surface having a dent recessed inward from the flat surface. The dent is opposed to the slot.

BRIEF DESCRIPTION OF THE DRAWINGS

The above and other objects, features and advantages of the present invention will become more apparent from the following detailed description made with reference to the accompanying drawings. In the drawings:

FIG. 2 is a perspective view showing a bracket of the HVAC system and a sheetmetal, to which the HVAC system is to be attached, according to a first embodiment;

DETAILED DESCRIPTION

First Embodiment

Figure 1:
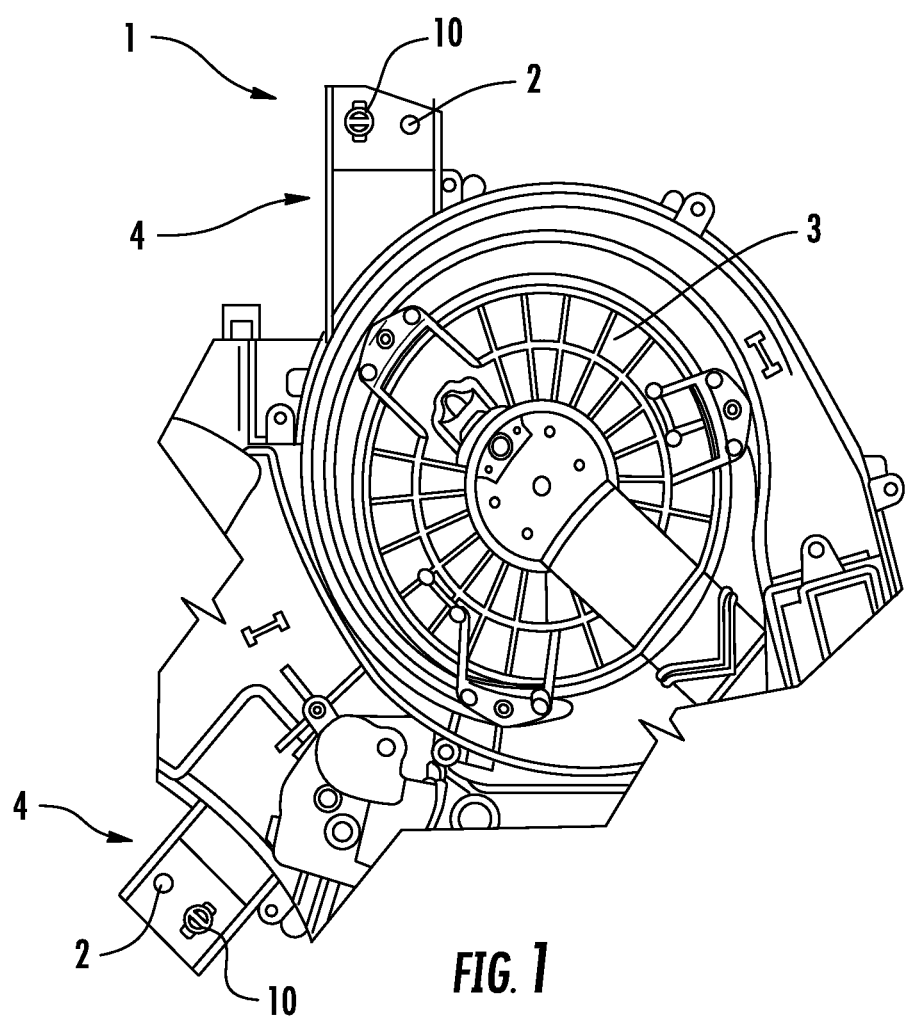
FIG. 1 is a front view showing an HVAC system according to the present disclosure.

As follows, a first embodiment of the present disclosure will be described with reference to FIGS. 1 to 7C. As shown in FIG. 1, an HVAC system includes an HVAC case 1 accommodating a blower fan 3, an evaporator (not shown), and the like. The HVAC case 1 is formed by molding a resin material in molding dies. The HVAC case 1 is molded integrally with multiple brackets 4. In the present example, the HVAC case 1 has two brackets 4. Each of the brackets 4 is integrally molded with a holder pin 10. When the HVAC system is installed in a vehicle, an operator locates the HVAC case 1 at a predetermined position and temporarily attaches the HVAC case 1 to a vehicle body by using the holder pin 10. Subsequently, the HVAC case 1 is fixed to the vehicle body by screwing a fastener such as a bolt 9 (FIG. 2) into a screw hole 2, which is formed in each of the brackets 4.

Figure 3:
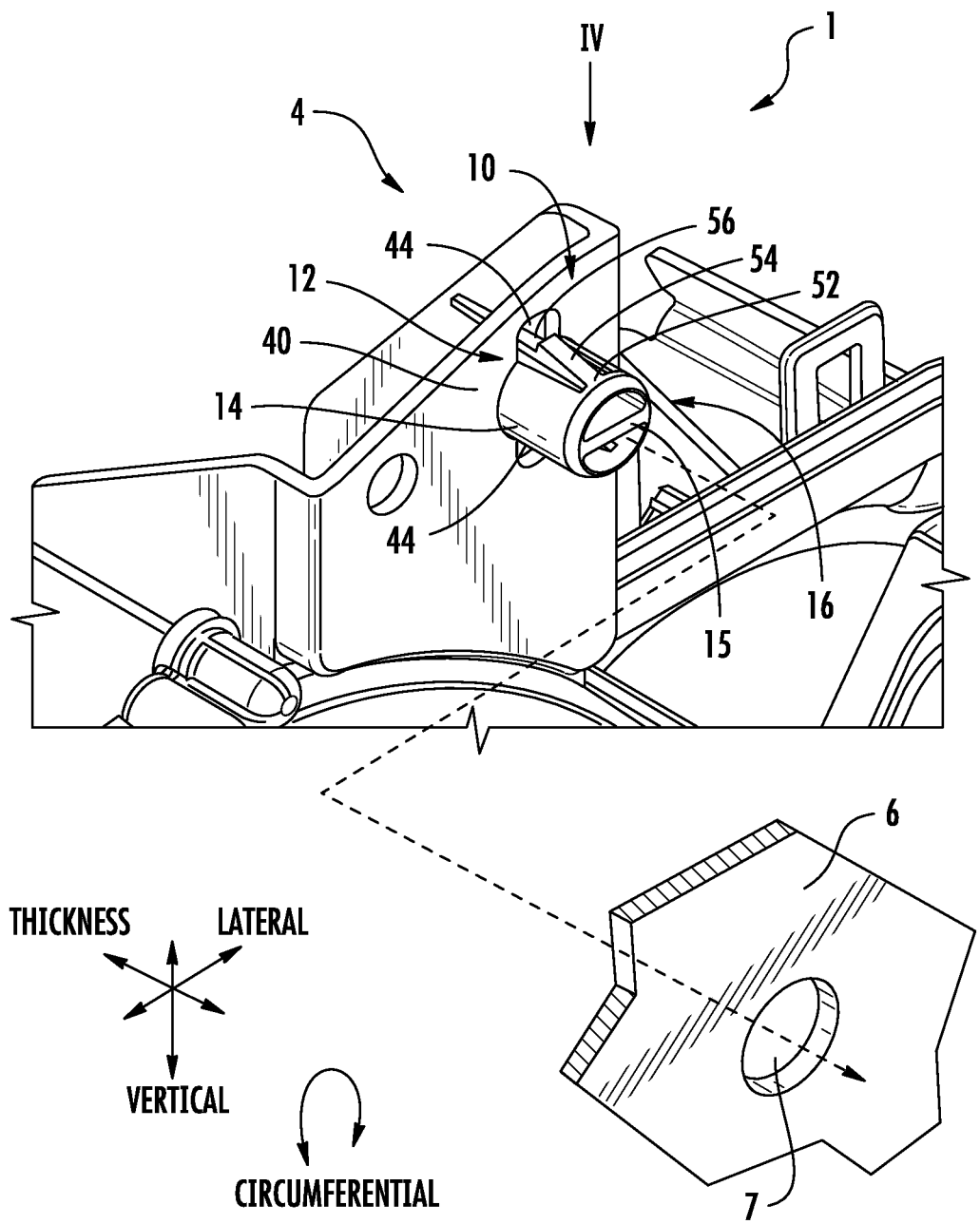
FIG. 3 is a perspective view showing the bracket viewed along the arrow III in FIG. 2.

As follows, the bracket 4 and the holder pin 10 will be described in detail. As shown in FIGS. 2 and 3, the bracket 4 has a base 40 from which the holder pin 10 is projected. The holder pin 10 is a hollow member having a tubular body 12 molded integrally with the base 40 at round walls 14 (FIG. 3). The round walls 14 are located along the lateral direction as shown by "lateral" in the drawing. The tubular body 12 is integrally molded with a plate-shaped inner rib 15 at the round walls 14. Each of the round walls 14 circumferentially extends for a certain angle in a circumferential direction as shown by "circumferential" in the drawing. The holder pin 10 is secured to the base 40 at the round walls 14.

When the HVAC system is installed in the vehicle, the HVAC case 1 is located such that the holder pin 10 is positioned at a corresponding circular hole 7 formed in a sheetmetal 6 of a vehicle body. Subsequently, as shown by the dotted arrow, the holder pin 10 is inserted into the hole 7 and is snap-fitted to the sheetmetal 6. In this way, the HVAC case 1 is temporarily attached to the vehicle body. The sheetmetal 6 is, for example, a plate member, which is a part of a vehicle component such as a frame of the vehicle. The sheetmetal 6 has a flat surface around the hole 7 to be in contact with the opposed surface of the base 40 when the holder pin 10 is attached to the sheetmetal 6.

Figure 5:
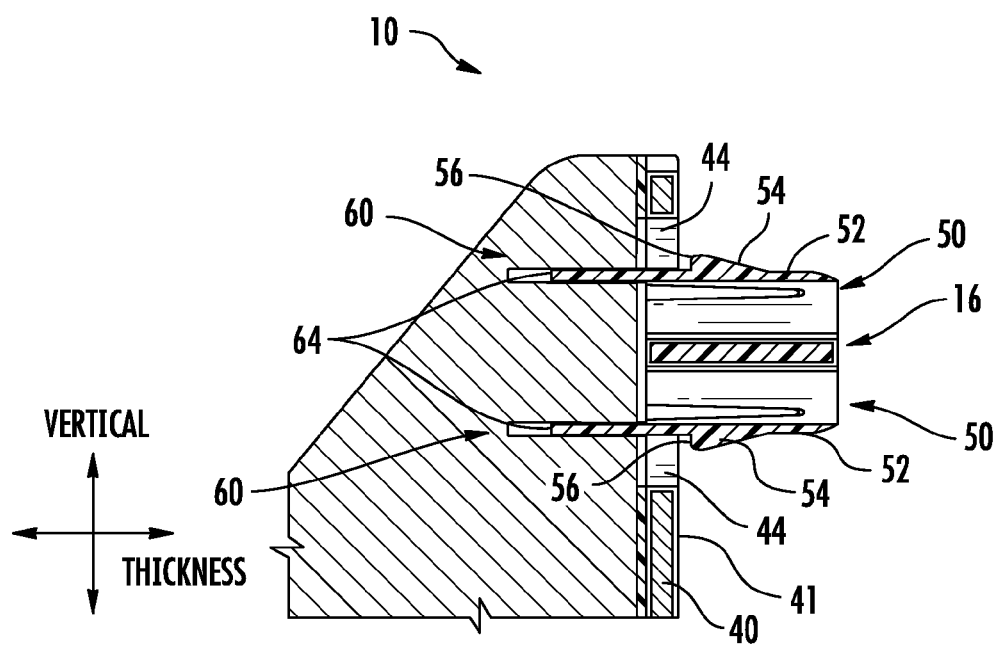
FIG. 5 is a sectional view taken along the line V-V in FIG. 4.

As shown in FIG. 5, the base 40 has two slots 44 along a vertical direction as shown by "vertical" in the drawing. Each of the two slots 44 extends through the base 40 in a thickness direction as shown by "thickness" in the drawing.

Referring back to FIG. 3, each of the two slots 44 circumferentially extends in the circumferential direction for a certain angle to form a hollow space in the base 40. The two round walls 14 and the two slots 44 are shifted in the circumferential direction from each other substantially at a right angle.

Figure 4:
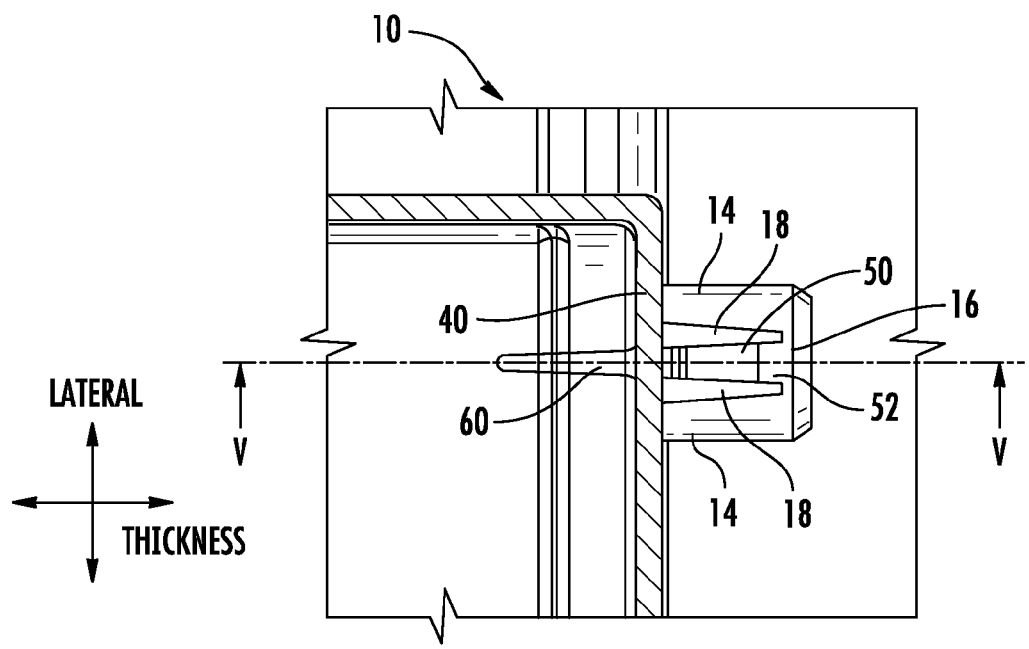
FIG. 4 is a top view showing the bracket viewed along the arrow IV in FIG. 3.

As shown in FIGS. 4 and 5, the holder pin 10 has two wings 50 and two tabs 60. The two wings 50 extend from a tip portion 16 of the tubular body 12 linearly in the thickness direction. Two tabs 60 extend linearly from the two wings 50 in the thickness direction through the slots 44, respectively, thereby to penetrate through the base 40. Each of the tabs 60 has a free end 64 on the opposite side of the base 40 from the wing 50. The tubular body 12 has two slits 18 on each side. Each wing 50 is interposed between the two slits 18 in the lateral direction. In the present configuration, one of the slits 18, the wing 50, the other of the slits 18, and the round wall 14 are arranged in this order in the circumferential direction.

The wing 50 has a cantilevered end 52 at which the wing 50 and the tab 60 are hang off the tip portion 16 thereby resiliently supported by the tip portion 16. The tab 60 is projected through the slot 44 to penetrate the base 40 in the thickness direction. The tab 60 is located on the opposite side of the base 40 from the tip portion 16.

In the present configuration, the slits 18 separate the wing 50 and the tab 60 from both the round walls 14 to form a cantilever structure, in which the wing 50 and the tab 60 are supported by the tubular body 12 mainly at the cantilevered end 52. The slits 18 enable the wing 50 and the tab 60 to be bent integrally about the cantilevered end 52. Thus, the wing 50 and the tab 60 are integrally bendable about the cantilevered end 52 within the slot 44 in the vertical direction. The wing 50 and the tab 60 may be further integrally bendable about the cantilevered end 52 within the slot 44 and slits 18 in the lateral direction.

Each of the two wings 50 has an angular wall 54 and a right-angled wall 56. The angular wall 54 extends leftward in FIG. 5 from the tip portion 16 toward the right-angled wall 56 in the thickness direction. The angular wall 54 gradually increases in height thereby to form a slant surface, which is radially inclined relative to the tubular body 12. The slant surface extends toward the slot 44 to be distant from the tubular body 12. The right-angled wall 56 has a flat surface, which is substantially in parallel with a base surface 41 of the base 40. The flat surface of the right-angled wall 56 is distant from the base surface 41 for a predetermined distance, which is substantially the same as a thickness of the sheetmetal 6 (FIG. 3).

Referring back to FIG. 3, when the holder pin 10 is snap-fitted to the sheetmetal 6, the tip portion 16 is first inserted into the hole 7. Subsequently, the angular wall 54 makes contact with a brim of the hole 7. As the tubular body 12 is inserted into the sheetmetal 6 along the dotted arrow, the angular wall 54 is applied with a force from the brim of the hole 7 in the vertical direction and is bent radially inward around the cantilevered end 52. When the angular wall 54 passes through the sheetmetal 6, the wing 50 springs back radially outward to recover its original form. At this time, the right-angled wall 56 is latched on the surface of the sheetmetal 6. Thus, the holder pin 10 is snap-fitted to the sheetmetal 6, and the HVAC system is temporarily attached to the sheetmetal 6.

The hole 7 may have a diameter slightly greater than the outer diameter of the tubular body 12 thereby to enable the holder pin 10 to move in both lateral and vertical directions. In this configuration, the HVAC system, which is temporarily attached to the sheetmetal 6, is slightly movable relative to the sheetmetal 6 thereby to facilitate adjustment of the location of the HVAC system when the HVAC system is screwed to the sheetmetal 6.

Subsequently, detachment of the holder pin 10 from the sheetmetal 6 will be described with reference to FIGS. 6A and 6B. When the vehicle receives, for example, a maintenance service, the HVAC system may be detached from the vehicle for cleaning and/or replacement of its components. When the HVAC system is detached from the sheetmetal 6, the bolt 9 is unscrewed from the screw hole 2 (FIG. 2), thereby the HVAC system is temporarily held on the sheetmetal 6 via the holder pin 10.

Figure 6A:
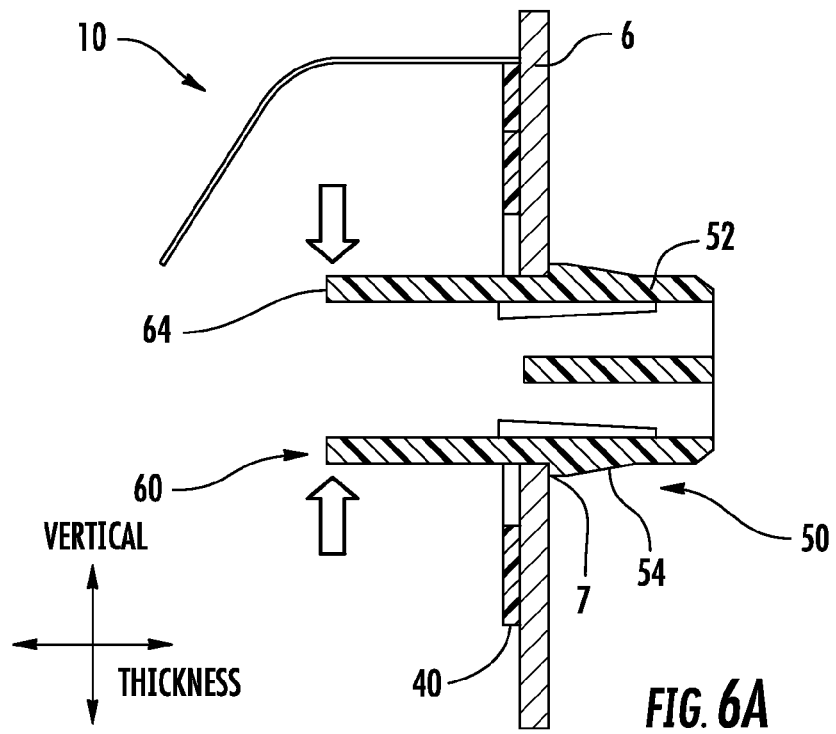
FIGS. 6A and 6B are sectional views each showing a holder pin of the bracket.

FIG. 6A shows the present state, in which the holder pin 10 is still snap-fitted to the sheetmetal 6. In the present state, as shown by the arrows, forces are exerted radially inward in the vertical direction onto the free ends 64 of the tabs 60 on the opposite side the cantilevered ends 52. The forces are exerted by, for example, an operator by pinching the free ends 64 with fingers. Thus, the tabs 60 and the wings 50 are integrally bent radially inward about the cantilevered ends 52, respectively. In this way, a distance between the inclined surfaces of the angular walls 54 is reduced to be less than the diameter of the hole 7. The tab 60 is effective to produce a bending moment at the cantilevered end 52 thereby to bend both the wing 50 and the tab 60 integrally about the cantilevered end 52.

Figure 6B:
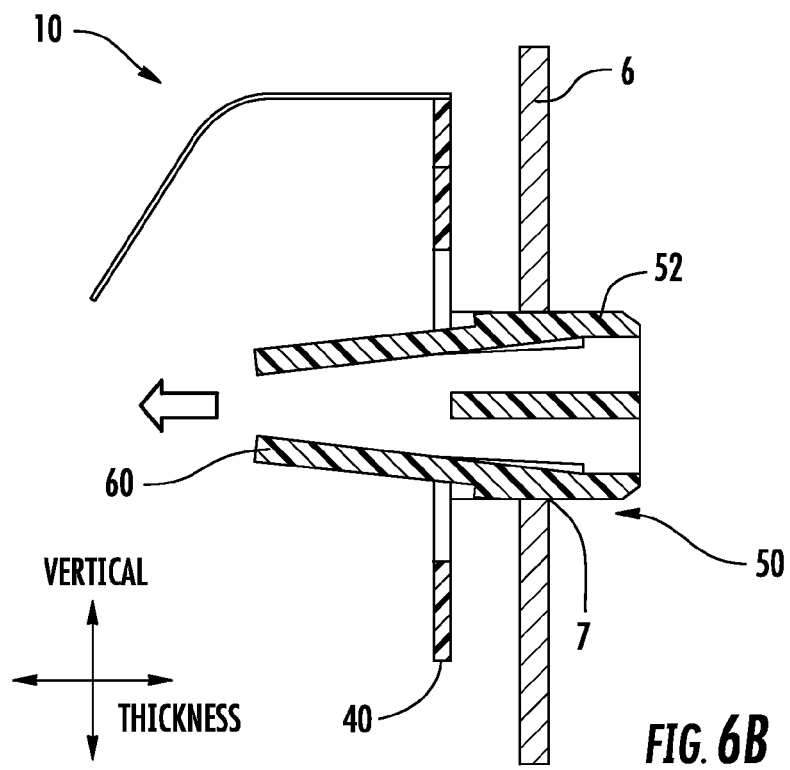

As shown in FIG. 6B, the holder pin 10 is pulled away from the sheetmetal 6 leftward in FIG. 6B as shown by the arrow. Specifically, an operator may pull the tabs 60 along a first direction leftward in FIG. 6B by using fingers thereby to draw the holder pin 10 from the hole 7. Alternatively or in addition, the HVAC system may be entirely moved along the first direction leftward in FIG. 6B while holding the tabs 60 bent radially inward. In the present configuration, the tabs 60 extending through the base 40 leftward in FIG. 6B enables the wings 50 to bend radially inward by manipulating the tabs 60 from the left side in FIG. 6B.

Figure 7A:
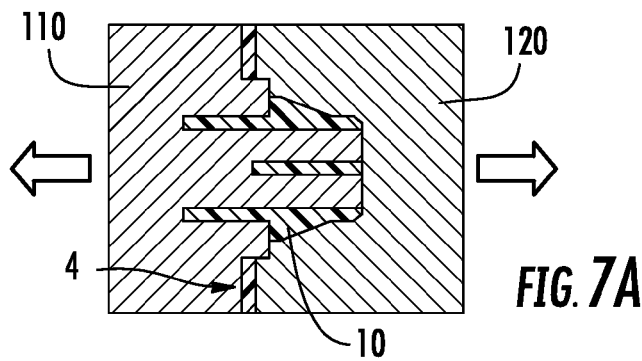
FIG. 7A is a sectional view showing the holder pin molded in a cavity formed between first and second molding cores.
Figure 7B:
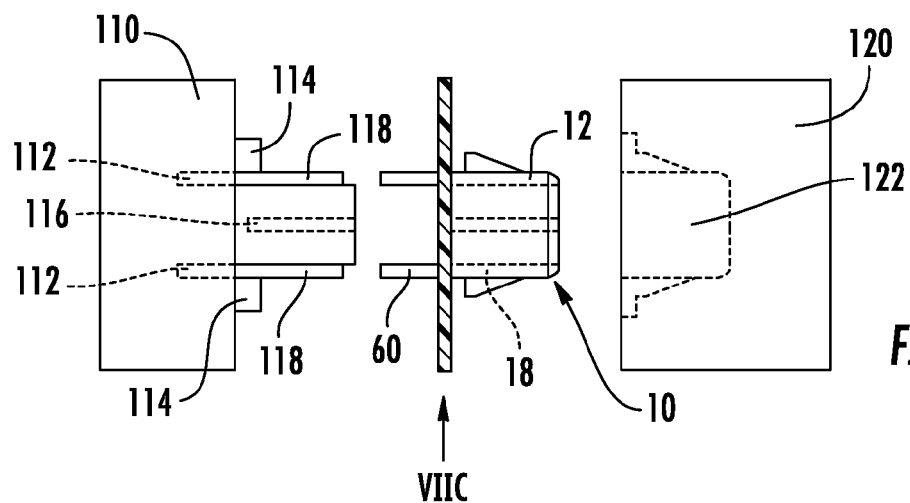
FIG. 7B is a side view showing the holder pin removed from the first and second molding cores, which are detached from each other.
Figure 7C:
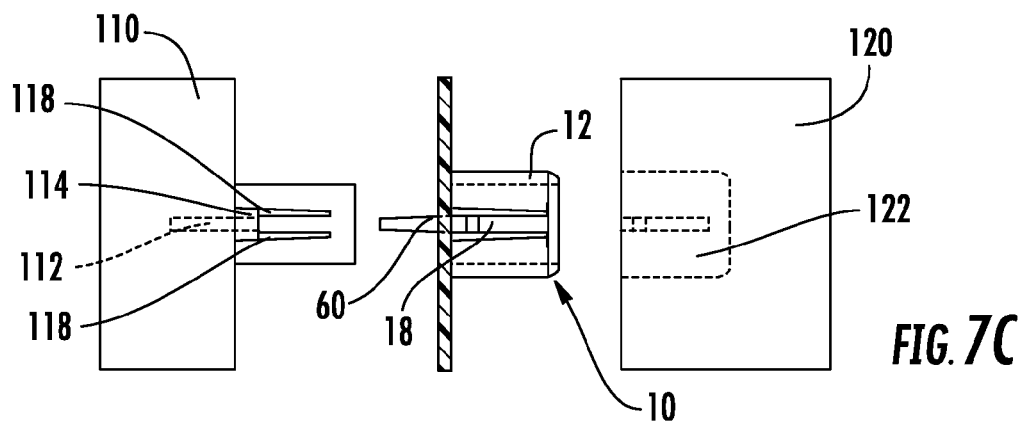
FIG. 7C is a top view viewed along the arrow VIIC in FIG. 7B.

Subsequently, a molding process for the holder pin 10 will be described with reference to FIGS. 7A to 7C. As shown in FIG. 7A, a resin material is injected into a molding cavity defined between a first molding core 110 and a second molding core 120, which are mated together. Thus, the injected resin material is molded into the holder pin 10 integrally with the bracket 4. In the present injection molding, the holder pin 10 and the bracket 4 may be integrally molded with the HVAC case 1 (FIG. 1) all together. After the molded product is cooled, the first and second molding cores 110 and 120 are moved in pull directions opposite from each other, as shown by the arrows. Thus, as shown in FIGS. 7B and 7C, the molded product is removed from the first and second molding cores 110 and 120.

The second molding core 120 has a pin cavity 122 for forming the outer periphery of the tubular body 12. The first molding core 110 has two tab cavities 112, two slot cores 114, a main pin 116, and two blades 118. The tab cavities 112 are used for molding the tabs 60, respectively. The slot cores 114 are used for forming the slots 44, respectively. The main pin 116 is used for forming the inner periphery of the tubular body 12. The blades 118 are provided on the sides of the main pin 116 for forming the slits 18. All the pin cavity 122, the tab cavities 112, the main pin 116, and the two blades 118 extend substantially along the pull directions. In the present example, the slot core 114 and the blades 118 are integrated with the main pin 116 without a gap thereamong, and the outer peripheries of the blades 118 and the tab cavity 112 linearly extend without a step.

(Operation Effect)

According to the above-described embodiment, the tabs 60 enable an operator to bend the wings 50 radially inward to release the wings 50 from the sheetmetal 6. More specifically, the tabs 60 extending through the base 40 leftward in FIG. 6A enables an operator to manipulate the tabs 60 from the left side in FIG. 6A to bend the wings 50 radially inward. Therefore, even in a case where an operator cannot access the wings 50 from the right side in FIG. 6A, an operator is enabled to stay on the left side in FIG. 6A when manipulating the tabs 60 and when drawing the HVAC system from the sheetmetal 6. In addition, the tabs 60 enable an operator to bend the wings 50 by causing the bending moment about the cantilevered ends 52, respectively. Therefore, the present configuration may significantly facilitate the maintenance work and to avoid damage of the wings 50 when the HVAC system is removed from the sheetmetal 6.

The holder pin 10 has the snap-fit configuration to enable the HVAC system to be held securely on the sheetmetal 6 with sufficient positional accuracy, without additional holding support by an operator.

The holder pin 10 is integrally molded with the tabs 60. The holder pin 10, the bracket 4, the HVAC case 1 may be integrally molded all together. The present configuration does not require an additional cost for an additional attachment component to attach the HVAC system to the sheetmetal 6 temporarily. Thus, the present configuration does not require additional burden for attaching the additional attachment component.

In the present example, all the pin cavity 122, the tab cavities 112, the main pin 116, and the two blades 118 extend substantially along the pull directions in which the first and second molding cores 110 and 120 are removed from each other. In addition, the outer peripheries of the blades 118 and the tab cavities 112 linearly extend without causing a reverse taper. Thus, the first and second molding cores 110 and 120 are movable in the pull directions along a single straight line, after molding the holder pin 10 integrally by a single injection process. Therefore, the present configuration does not require an additional slide core, which is movable in a direction different from the pull directions. Thus, the holder pin 10 is molded to have the tubular body 12, the wings 50, the tabs 60, the slits 18, and the slots 44 extending substantially uniformly along the pull directions.

In the present example, the slot core 114 and the blades 118 are integrated with the main pin 116 without a gap thereamong. The present configuration enables to form the slot 44 and the slits 18 unified together to form a single hollow space thereby to enable the tab 60 and the wing 50 to move freely within the slot 44 and slits 18.

Second Embodiment

Figure 8:
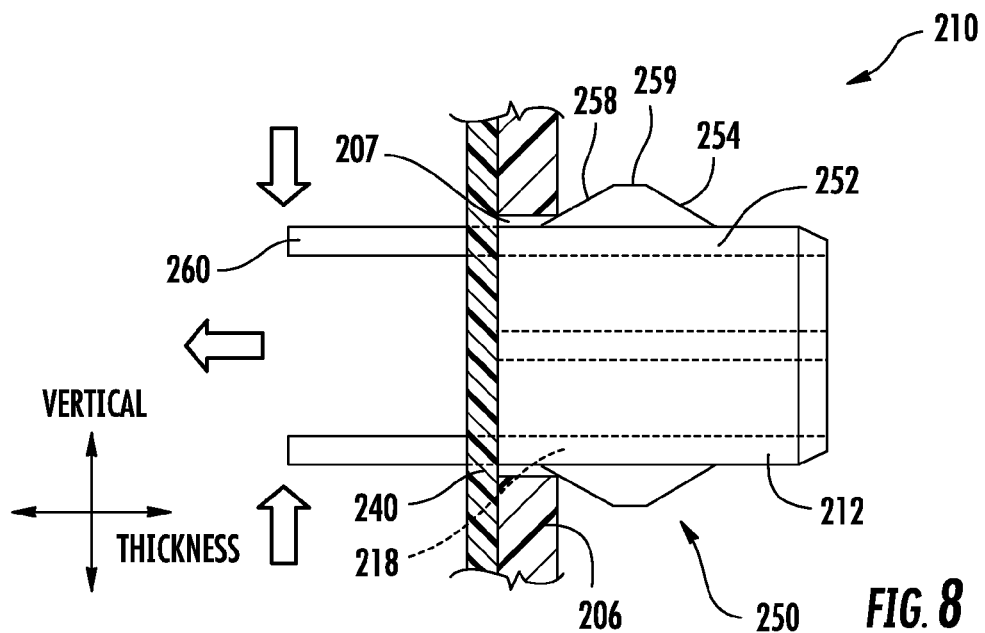
FIG. 8 is a side view showing a holder pin according to a second embodiment.

As shown in FIG. 8, a holder pin 210 has two wings 250. Similarly to the first embodiment, each of the two wings 250 is partitioned by slits 218 and supported at a cantilevered end 252. Each of the two wings 250 has a first angular wall 254 extending from the cantilevered end 252 leftward in FIG. 8. The first angular wall 254 gradually increases in height thereby to form a first slant surface, which is radially inclined relative to the tubular body 12. The first slant surface extends toward a base 240 to be distant from a tubular body 212.

Dissimilarly to the first embodiment, the wing 250 has a second angular wall 258 on the opposite side of a flat wall 259 from the first angular wall 254. The second angular wall 258 extends from the flat wall 259 leftward in FIG. 8 to decrease in height gradually thereby to form a second slant surface. The second slant surface is radially inclined relative to the tubular body 212. The second slant surface extends toward the base 240 to be close to the tubular body 212. The holder pin 210 is configured to be snap-fitted to a sheetmetal 206, similarly to the first embodiment, thereby to enable the HVAC system to be attached to the sheetmetal 206 temporarily.

In the state shown in FIG. 8, the holder pin 210 is snap-fitted to the sheetmetal 206, and the second angular wall 258 is resiliently latched to a brim of a hole 207 formed in the sheetmetal 206. Thus, the second angular wall 258 restricts detachment of the holder pin 210 resiliently from the sheetmetal 206.

In addition, an operator may pinch tabs 260 in the vertical direction, as shown by the arrows, thereby to bend the tabs 260 and the wings 250 integrally radially inward about the cantilevered ends 252. Thus, the operator may draw the holder pin 210 from the sheetmetal 206 leftward in FIG. 8 as shown by the arrow. Alternatively, the holder pin 210 may be simply pushed leftward in FIG. 8 from the right side in FIG. 8, without manipulating the tabs 260. In this case, the second angular walls 258 are resiliently pushed from the brim of the hole 207 radially inward to bend the tabs 260 and the wings 250 radially inward.

Similarly to the first embodiment, the holder pin 210 is configured to attach the HVAC system to the sheetmetal 206 temporarily, and an operator is enabled to remove the holder pin 210 from the sheetmetal 206 without damaging the holder pin 210.

In the second to fifth embodiments, similarly to the first embodiment, the holder pin can be molded integrally with the bracket, without an additional slide core other than the first and second cores.

Third Embodiment

Figure 9:
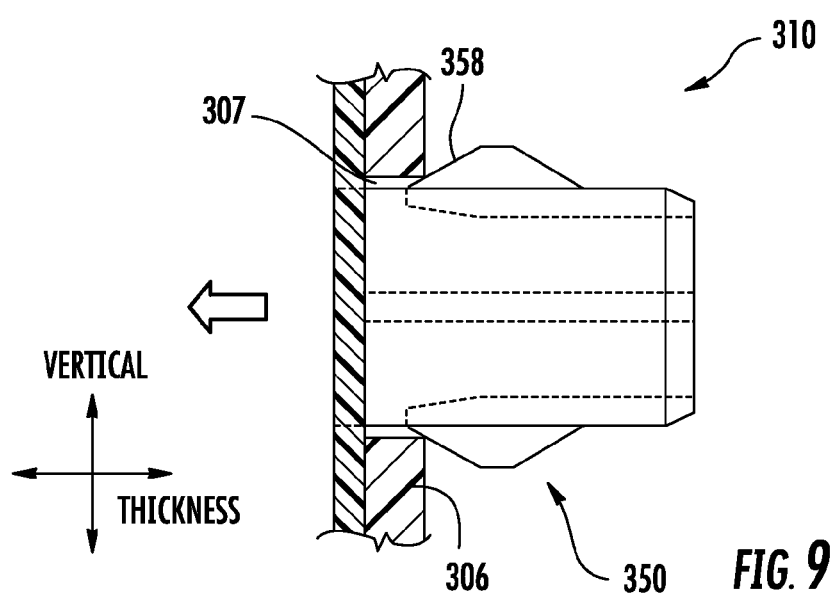
FIG. 9 is a side view showing a holder pin according to a third embodiment.

As shown in FIG. 9, a holder pin 310 according to the third embodiment has a configuration, which excludes the tabs 260 from the holder pin 210 of the second embodiment. In order to detach the holder pin 310 from a sheetmetal 306, the holder pin 310 may be simply pushed leftward in FIG. 9 from the right side in FIG. 9, or the HVAC system may be entirely moved leftward in FIG. 9 from the left side in FIG. 9. Similarly to the second embodiment, second angular walls 358 are resiliently pushed from the brim of a hole 307 radially inward to bend wings 350 radially inward.

Fourth Embodiment

Figure 10:
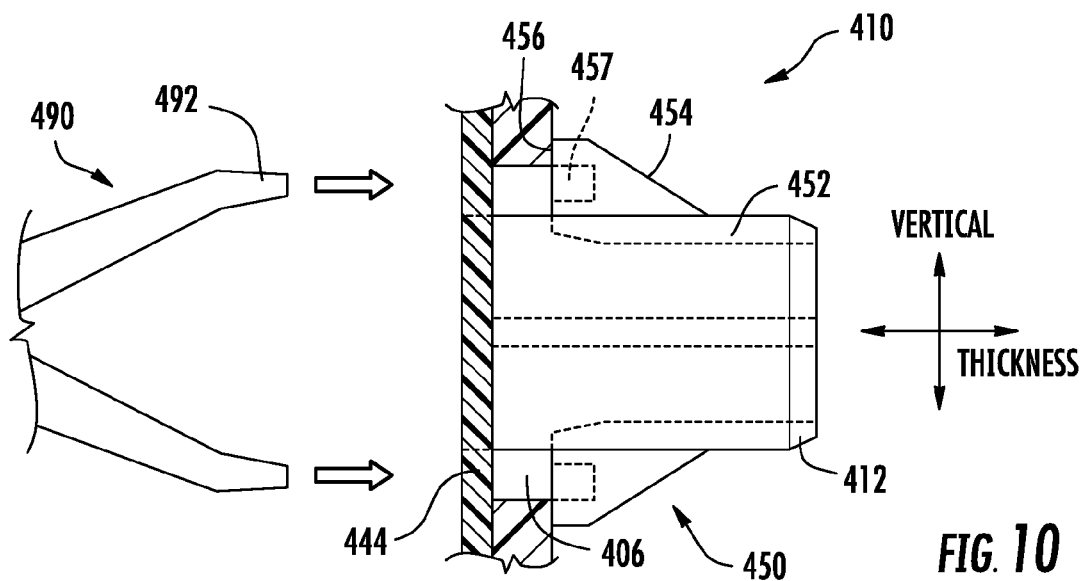
FIG. 10 is a side view showing a holder pin according to a fourth embodiment and a plier for detaching the holder pin.

As shown in FIG. 10, a holder pin 410 according to the fourth embodiment has two wings 450 each having an angular wall 454 and a right-angled wall 456. The wing 450 has a dent 457 in the right-angled wall 56. The dent 457 is recessed inward from a flat surface into the right-angled wall 56. The dent 457 is opposed to a slot 444. In FIG. 10, the holder pin 410 is snap-fitted to a sheetmetal 406. In the present state, a plier 490 is used to detach the holder pin 410 from the sheetmetal 406. Specifically, an operator moves the plier 490 toward the holder pin 410 rightward in FIG. 10 and inserts two claws 492 of the plier 490 into the dents 457, respectively. Subsequently, the operator grabs handles (not shown) of the plier 490 to manipulate the claws 492 to pinch the dents 457 inward thereby to bend the wings 450 radially inward about cantilevered ends 452. In this way, the wings 450 are drawn into a tubular body 412 radially inward to enable the operator to draw the holder pin 410 leftward in FIG. 10, while pinching the dents 457 with the plier 490. The configuration of the fourth embodiment also enable an operator to manipulate the wings 450 from the left side in FIG. 10 and to draw the holder pin 410 leftward in FIG. 10, similarly to the first embodiment.

Fifth Embodiment

Figure 11:
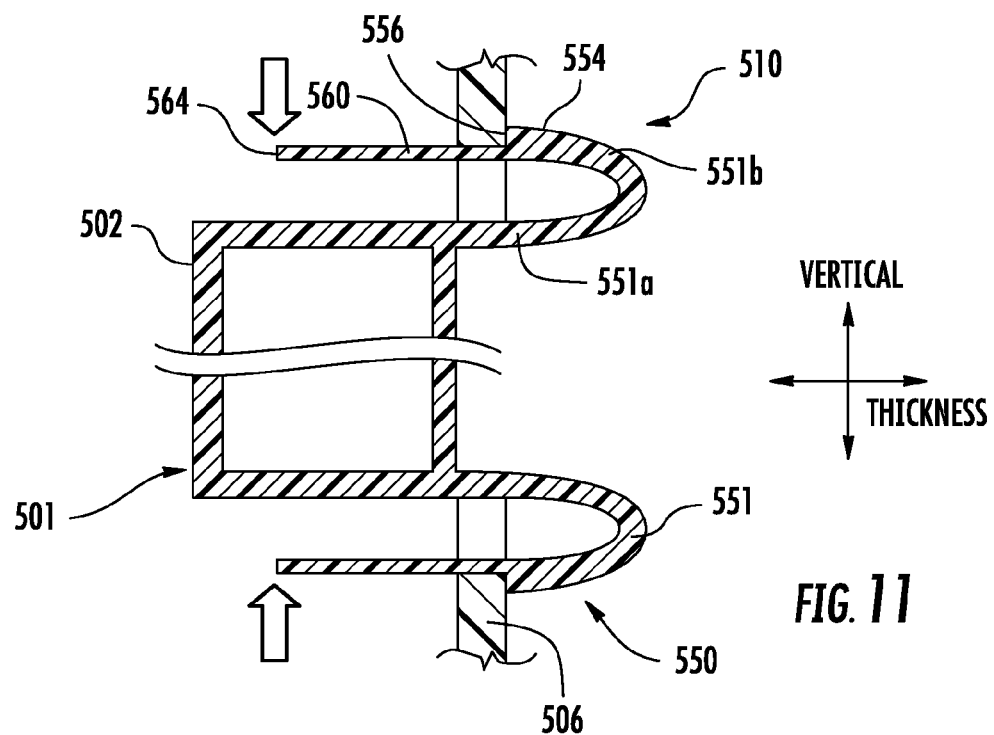
FIG. 11 is a schematic sectional view showing an HVAC case integrally molded with holders according to a fifth embodiment.

As shown in FIG. 11, an HVAC case 501 includes a case body 502 and holders 510. The holders 510 are integrally molded with the case body 502. In the fifth embodiment, the HVAC case 501 does not include the above-described bracket 4 equipped with the holder pin 10.

Each of the holders 510 includes a bendable portion 551, a wing 550, and a tab 560. The bendable portion 551 is substantially in a U-shape or a V-shape to have a first end 551a and a second end 551b. The first end 551a connects the bendable portion 551 with the case body 502. The wing 550 extends from the second end 551b in the thickness direction. The tab 560 further extends from the wing 550 to have a free end 564 on the opposite side of the wing 550 from bendable portion 551. The wing 550 has an angular wall 554 and a right-angled wall 556. The angular wall 554 extends from the bendable portion 551 toward the right-angled wall 556. In the state of FIG. 11, the HVAC case 501 is snap-fitted to a sheetmetal 506 at the holders 510. When an operator detaches the HVAC case 501, the operator may pinch the free ends 564 of the tabs 560 inward to release the right-angled walls 556 from the sheetmetal 506, thereby to enable the HVAC case 501 to be drawn leftward in FIG. 11 from the sheetmetal 506. In the example shown in FIG. 11, the holders 510 are equipped to the upper and lower sides of the HVAC case 501 along the vertical direction, nevertheless, the holders 510 may be equipped to at least one of lateral sides and/or at least one of upper and lower sides of the HVAC case 501.

Other Embodiment

The number of the wings is not limited to two for each holder pin. Each holder pin and/or each HVAC case may have one wing or may have three or more wings. The number of the tabs is not limited to zero or two for each holder pin. Each holder pin and/or each HVAC case may have one tab or may have three or more tabs.

The lateral direction and the vertical direction in the above embodiments do not limit the installation of the HVAC system. The HVAC system may be installed in various directions.

The number of the bracket may be one and may be three or more. The bracket may be a separate component from the HVAC case and may be coupled to the HVAC case separately.

The bracket and the holder pin according to any one of the first to fourth embodiments and the holder according to the fifth embodiment may be combined. That is, the HVAC case may have both the bracket equipped with the holder pin and the holder of the fifth embodiment.

The present disclosure is not limited to application to HVAC system. The present disclosure is applicable to various kinds of plastic component, which is to be coupled with another component.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A detachable holder comprising:

a base; and a body integrally molded with the base and projected from the base, wherein when the body is inserted in a hole formed in a plate member:

the body holds the base on the plate member;

the body locates the base relative to the plate member;

the base is detachable from the plate member from one side of the plate member; and the base is detachable from the plate member from an other side of the plate member opposite of the one side, wherein the base has a slot, which is a hollow space, and the body is a tubular body substantially in a tubular shape, the tubular body includes a tip portion, a wing, and a tab,
the wing extends from the tip portion toward the base,
the tab extends from the wing through the slot, and
the tab has a free end on an opposite side of the base from the wing.

2. The detachable holder according to claim 1, wherein
the tubular body has slits each being a hollow space extending substantially in parallel with the wing,
the wing is interposed between the slits, and
the wing is resiliently supported by the tip portion at a cantilevered end.

3. The detachable holder according to claim 2, wherein
the wing includes a first angular wall and a right-angled wall,
the first angular wall extends from the cantilevered end toward the right-angled wall,
the first angular wall gradually increases in height thereby to form a first slant surface, which is inclined relative to the tubular body, the first slant surface extending toward the slot to be distant from the tubular body, and
the right-angled wall is faced to the slot.

4. The detachable holder according to claim 3, wherein
the right-angled wall has a substantially flat surface, which is substantially in parallel with a base surface of the base, and
the flat surface is distant from the base surface for a predetermined distance.

5. The detachable holder according to claim 2, wherein
the wing includes a first angular wall and a second angular wall,
the first angular wall extends from the cantilevered end toward the second angular wall,
the first angular wall gradually increases in height thereby to form a first slant surface, which is inclined relative to the tubular body, the first slant surface extending toward the slot to be distant from the tubular body, and
the second angular wall gradually decreases in height thereby to form a second slant surface, which is inclined relative to the tubular body, the second slant surface extending toward the slot to be close to the tubular body.

6. The detachable holder according to claim 2, wherein the tubular body, the wing, the tab, the slits and the slot extend substantially in a same direction.

7. The detachable holder according to claim 6, wherein the slits are unified with the slot to form a single hollow space.

8. The detachable holder according to claim 2, wherein
the tab extends from the wing to the free end in a first direction,
the tubular body is configured to be snap-fitted to the hole formed in the plate member, and
the tab is configured to bend the wing at the cantilevered end radially into the tubular body, when exerted with a force at the free end, to enable the tubular body to be drawn from the plate member in the first direction.

9. The detachable holder according to claim 1, wherein
the wing is located on each of two sides of the tubular body, and
the tab extends from each wing.

10. The detachable holder according to claim 9, wherein
the tubular body includes a round wall on each of two sides,
the tubular body is connected with the base at the round wall, and
the round wall is shifted circumferentially from the wing substantially at a right angle.

11. The detachable holder according to claim 1, further comprising:
a bracket integrally molded with the base and a case for a heating, ventilation, air conditioning system.

12. A detachable holder comprising:
a base; and
a tubular body integrally molded with the base and projected from the base, wherein
the tubular body includes a tip portion and a wing,
the wing includes a first angular wall and a second angular wall,
the first angular wall extends from the tip portion toward the second angular wall,
the first angular wall gradually increases in height thereby to form a first slant surface, which is inclined relative to the tubular body, the first slant surface extending toward the base to be distant from the tubular body,
the second angular wall extends from the first angular wall toward the base, and
the second angular wall gradually decreases in height thereby to form a second slant surface, which is inclined relative to the tubular body, the second slant surface extending toward the base to be close to the tubular body.

13. The detachable holder according to claim 12, wherein
the tubular body has slits each being a hollow space extending substantially in parallel with the wing,
the wing is interposed between the slits, and
the wing is resiliently supported by the tip portion at a cantilevered end.

14. A detachable holder comprising:
a base having a slot, which is a hollow space; and
a tubular body integrally molded with the base and projected from the base, wherein
the tubular body includes a tip portion and a wing,
the wing extends from the tip portion toward the base,
the wing includes a first angular wall and a right-angled wall,
the first angular wall extends from the tip portion toward the right-angled wall,
the first angular wall gradually increases in height thereby to form a first slant surface, which is inclined relative to the tubular body, the first slant surface extending toward the slot to be distant from the tubular body,
the right-angled wall is faced to the slot,
the right-angled wall has a substantially flat surface having a dent recessed inward from the flat surface, and
the dent is opposed to the slot.

15. The detachable holder according to claim 14, wherein
the tubular body has slits each being a hollow space extending substantially in parallel with the wing,
the wing is interposed between the slits, and
the wing is resiliently supported by the tip portion at a cantilevered end.

* * * * *